(12) United States Patent
Strassner

(10) Patent No.: US 7,464,145 B2
(45) Date of Patent: Dec. 9, 2008

(54) REPOSITORY-INDEPENDENT SYSTEM AND METHOD FOR ASSET MANAGEMENT AND RECONCILIATION

(75) Inventor: John Strassner, Colorado Springs, CO (US)

(73) Assignee: Intelliden, Inc., Colorado Springs, CO (US)

( * ) Notice: Subject to any disclaimer, the term of this patent is extended or adjusted under 35 U.S.C. 154(b) by 822 days.

(21) Appl. No.: 10/617,420

(22) Filed: Jul. 10, 2003

(65) Prior Publication Data

US 2004/0148369 A1  Jul. 29, 2004

Related U.S. Application Data

(60) Provisional application No. 60/395,698, filed on Jul. 11, 2002.

(51) Int. Cl.
*G06F 15/177* (2006.01)
(52) U.S. Cl. .................. 709/220; 709/221; 709/223
(58) Field of Classification Search .................. 709/203, 709/220, 221, 223
See application file for complete search history.

(56) References Cited

U.S. PATENT DOCUMENTS

| 4,991,089 A | 2/1991 | Shorter |
| 5,109,486 A | 4/1992 | Seymour |
| 5,159,685 A | 10/1992 | Kung |
| 5,442,791 A | 8/1995 | Wrabetz et al. |
| 5,475,819 A | 12/1995 | Miller et al. |
| 5,491,820 A | 2/1996 | Belove et al. |
| 5,506,966 A | 4/1996 | Ban |
| 5,519,704 A | 5/1996 | Farinacci et al. |
| 5,535,335 A | 7/1996 | Cox |
| 5,557,748 A | 9/1996 | Noris |
| 5,581,764 A | 12/1996 | Fitzgerald et al. |
| 5,659,746 A | 8/1997 | Bankert |
| 5,680,551 A | 10/1997 | Martin |
| 5,724,509 A | 3/1998 | Starkweather et al. |
| 5,726,883 A | 3/1998 | Levine et al. |
| 5,751,965 A | 5/1998 | Mayo |
| 5,751,967 A | 5/1998 | Raab et al. |

(Continued)

FOREIGN PATENT DOCUMENTS

EP  0 384 339 A2  8/1990

(Continued)

OTHER PUBLICATIONS

Noms, IEEE 1992 Network Operations and Management Symposium, 1992, vol. 1, IEEE Communications Society, NewYork, USA.

(Continued)

*Primary Examiner*—Phuoc H Nguyen
(74) *Attorney, Agent, or Firm*—Cooley Godward Kronish LLP

(57) ABSTRACT

A system and method for managing network device configurations is described. In one embodiment a device configuration is represented by configuration knowledge and configuration data, wherein the configuration knowledge may comprise one or more configuration knowledge instances, and the configuration data may comprise one or more configuration data instances. In preferred forms, the configuration knowledge instances and configuration data instances may comprise one or more schemata, which may be created, modified, or deleted without affecting other portions of a configuration knowledge instance or configuration data instance.

5 Claims, 6 Drawing Sheets

U.S. PATENT DOCUMENTS

| | | |
|---|---|---|
| 5,764,955 A | 6/1998 | Doolan |
| 5,784,702 A | 7/1998 | Greenstein et al. |
| 5,787,246 A | 7/1998 | Lichtman et al. |
| 5,796,732 A | 8/1998 | Mazzola et al. |
| 5,812,768 A | 9/1998 | Page |
| 5,819,028 A | 10/1998 | Manghirmalani et al. |
| 5,819,042 A | 10/1998 | Hansen |
| 5,832,503 A | 11/1998 | Malik et al. |
| 5,838,918 A | 11/1998 | Prager et al. |
| 5,842,040 A | 11/1998 | Hughes et al. |
| 5,852,740 A | 12/1998 | Estes |
| 5,872,928 A | 2/1999 | Lewis et al. |
| 5,878,432 A | 3/1999 | Misheski |
| 5,884,028 A | 3/1999 | Kindell et al. |
| 5,889,943 A | 3/1999 | Ji |
| 5,889,953 A | 3/1999 | Thebaut et al. |
| 5,901,320 A | 5/1999 | Takahashi |
| 5,920,701 A | 7/1999 | Miller et al. |
| 5,923,850 A | 7/1999 | Barroux |
| 5,944,782 A | 8/1999 | Noble et al. |
| 5,948,065 A | 9/1999 | Eilert et al. |
| 5,956,341 A | 9/1999 | Galand et al. |
| 5,961,594 A | 10/1999 | Bouvier et al. |
| 5,968,122 A | 10/1999 | Schlosser et al. |
| 5,968,176 A | 10/1999 | Nessett et al. |
| 5,974,236 A | 10/1999 | Sherman |
| 5,980,078 A | 11/1999 | Krivoshein et al. |
| 5,999,948 A | 12/1999 | Nelson |
| 6,006,035 A | 12/1999 | Nabahi |
| 6,014,697 A | 1/2000 | Lewis |
| 6,016,306 A | 1/2000 | Le Boudec et al. |
| 6,023,586 A | 2/2000 | Gaisford et al. |
| 6,028,846 A | 2/2000 | Cain |
| 6,041,347 A | 3/2000 | Harsham et al. |
| 6,049,828 A | 4/2000 | Dev et al. |
| 6,055,568 A | 4/2000 | Adams |
| 6,085,253 A | 7/2000 | Blackwell |
| 6,088,804 A | 7/2000 | Hill |
| 6,097,697 A | 8/2000 | Yao et al. |
| 6,098,094 A | 8/2000 | Barnhouse et al. |
| 6,098,101 A | 8/2000 | Sears |
| 6,098,108 A | 8/2000 | Sridhar et al. |
| 6,101,508 A | 8/2000 | Wolff |
| 6,104,700 A | 8/2000 | Haddock et al. |
| 6,105,069 A | 8/2000 | Franklin et al. |
| 6,108,699 A | 8/2000 | Moiin |
| 6,108,703 A | 8/2000 | Leighton et al. |
| 6,122,664 A | 9/2000 | Boukobza et al. |
| 6,128,729 A | 10/2000 | Kimball et al. |
| 6,131,118 A | 10/2000 | Stupek, Jr. et al. |
| 6,131,119 A | 10/2000 | Fukui |
| 6,154,776 A | 11/2000 | Martin |
| 6,167,445 A | 12/2000 | Gai et al. |
| 6,170,009 B1 | 1/2001 | Mandal et al. |
| 6,170,011 B1 | 1/2001 | Macleod Beck et al. |
| 6,173,312 B1 | 1/2001 | Atarashi |
| 6,182,094 B1 | 1/2001 | Humpleman et al. |
| 6,198,479 B1 | 3/2001 | Humpleman et al. |
| 6,202,090 B1 | 3/2001 | Simone |
| 6,211,877 B1 | 4/2001 | Steele |
| 6,226,654 B1 | 5/2001 | Van Hoff |
| 6,240,458 B1 | 5/2001 | Gilbertson |
| 6,243,747 B1 * | 6/2001 | Lewis et al. ................. 709/220 |
| 6,243,815 B1 | 6/2001 | Antur |
| 6,247,049 B1 | 6/2001 | Scott |
| 6,253,240 B1 | 6/2001 | Axberg |
| 6,260,072 B1 | 7/2001 | Rodriguez-Moral |
| 6,269,398 B1 | 7/2001 | Leong et al. |
| 6,272,526 B1 | 8/2001 | Robinson |
| 6,286,038 B1 | 9/2001 | Reichmeyer |
| 6,292,889 B1 | 9/2001 | Fitzgerald et al. |
| 6,338,149 B1 | 1/2002 | Ciccone |
| 6,349,306 B1 | 2/2002 | Malik et al. |
| 6,356,955 B1 | 3/2002 | Hollberg et al. |
| 6,363,411 B1 | 3/2002 | Dugan et al. |
| 6,363,421 B2 | 3/2002 | Barker |
| 6,370,119 B1 | 4/2002 | Basso et al. |
| 6,374,293 B1 | 4/2002 | Dev |
| 6,381,631 B1 | 4/2002 | Van Hoff |
| 6,393,425 B1 | 5/2002 | Kelly |
| 6,418,468 B1 | 7/2002 | Ahlstrom et al. |
| 6,426,959 B1 | 7/2002 | Jacobson |
| 6,438,594 B1 | 8/2002 | Bowman-Amuah |
| 6,442,608 B1 | 8/2002 | Knight et al. |
| 6,449,638 B1 | 9/2002 | Wecker et al. |
| 6,449,646 B1 | 9/2002 | Sikora |
| 6,453,255 B1 | 9/2002 | Smorodinsky |
| 6,463,470 B1 * | 10/2002 | Mohaban et al. ............ 709/223 |
| 6,463,583 B1 | 10/2002 | Hammond |
| 6,466,580 B1 | 10/2002 | Leung |
| 6,470,453 B1 | 10/2002 | Vilhuber |
| 6,473,775 B1 | 10/2002 | Kusters |
| 6,496,843 B1 | 12/2002 | Getchius et al. |
| 6,496,858 B1 | 12/2002 | Frailong |
| 6,539,425 B1 | 3/2003 | Stevens et al. |
| 6,546,416 B1 | 4/2003 | Kirsch |
| 6,550,060 B1 | 4/2003 | Hammond |
| 6,564,056 B1 | 5/2003 | Fitzgerald |
| 6,567,406 B1 | 5/2003 | Skemer |
| 6,571,285 B1 | 5/2003 | Groath |
| 6,598,177 B1 | 7/2003 | Jones |
| 6,609,108 B1 | 8/2003 | Pulliam et al. |
| 6,615,166 B1 | 9/2003 | Guheen et al. |
| 6,615,218 B2 | 9/2003 | Mandal |
| 6,625,590 B1 | 9/2003 | Chen et al. |
| 6,628,304 B2 | 9/2003 | Mitchell |
| 6,636,877 B1 | 10/2003 | Doleac et al. |
| 6,643,289 B1 | 11/2003 | Natanson |
| 6,643,640 B1 | 11/2003 | Getchius et al. |
| 6,654,799 B1 | 11/2003 | Tanaka |
| 6,658,526 B2 | 12/2003 | Nguyen et al. |
| 6,678,370 B1 | 1/2004 | Freebersyser |
| 6,678,827 B1 | 1/2004 | Rothermel et al. |
| 6,684,241 B1 | 1/2004 | Sandick |
| 6,684,244 B1 | 1/2004 | Goldman et al. |
| 6,697,967 B1 | 2/2004 | Robertson |
| 6,725,233 B2 | 4/2004 | Froyd et al. |
| 6,725,262 B1 | 4/2004 | Choquier |
| 6,725,264 B1 | 4/2004 | Christy |
| 6,732,175 B1 | 5/2004 | Abjanic |
| 6,738,910 B1 | 5/2004 | Genty |
| 6,760,761 B1 * | 7/2004 | Sciacca ...................... 709/220 |
| 6,760,767 B1 | 7/2004 | Miesbauer |
| 6,766,369 B1 | 7/2004 | Haitsuka |
| 6,769,116 B1 | 7/2004 | Sexton |
| 6,772,206 B1 | 8/2004 | Lowry |
| 6,775,698 B1 | 8/2004 | Simone |
| 6,782,474 B1 | 8/2004 | Ylonen |
| 6,810,427 B1 | 10/2004 | Cain |
| 6,816,897 B2 | 11/2004 | McGuire |
| 6,826,597 B1 | 11/2004 | Lonnroth et al. |
| 6,832,247 B1 | 12/2004 | Cochran |
| 6,834,298 B1 | 12/2004 | Singer |
| 6,847,994 B1 | 1/2005 | Akimoto |
| 6,865,673 B1 | 3/2005 | Nessett |
| 6,895,431 B1 | 5/2005 | Bero |
| 6,895,588 B1 | 5/2005 | Ruberg |
| 6,907,572 B2 | 6/2005 | Little et al. |
| 6,931,016 B1 | 8/2005 | Andersson |
| 6,931,444 B2 | 8/2005 | Schweitzer |
| 6,938,079 B1 * | 8/2005 | Anderson et al. ........... 709/222 |
| 6,959,332 B1 | 10/2005 | Zavalkovsky |
| 6,978,301 B2 | 12/2005 | Tindal |
| 6,990,591 B1 | 1/2006 | Pearson |

| | | |
|---|---|---|
| 7,003,560 B1 | 2/2006 | Mullen |
| 7,016,955 B2 | 3/2006 | Martin |
| 7,127,526 B1 | 10/2006 | Duncan |
| 7,145,871 B2 | 12/2006 | Levy |
| 2001/0034771 A1 | 10/2001 | Hutsch |
| 2001/0053991 A1 | 12/2001 | Bonabeau |
| 2002/0007411 A1 | 1/2002 | Shaked |
| 2002/0032769 A1 | 3/2002 | Barkai et al. |
| 2002/0032775 A1 | 3/2002 | Venkataramaiah |
| 2002/0032871 A1 | 3/2002 | Malan |
| 2002/0038320 A1 | 3/2002 | Brook |
| 2002/0051080 A1 | 5/2002 | Tanaka |
| 2002/0052719 A1 | 5/2002 | Alexander |
| 2002/0069143 A1 | 6/2002 | Cepeda |
| 2002/0072956 A1 | 6/2002 | Willems |
| 2002/0073185 A1* | 6/2002 | Lee et al. .................... 709/222 |
| 2002/0078068 A1 | 6/2002 | Krishnaprasad |
| 2002/0078382 A1 | 6/2002 | Sheikh |
| 2002/0143927 A1 | 10/2002 | Maltz |
| 2002/0161863 A1 | 10/2002 | McGuire |
| 2002/0169858 A1 | 11/2002 | Bellinger |
| 2002/0171762 A1 | 11/2002 | Maxson et al. |
| 2002/0173997 A1 | 11/2002 | Menard |
| 2002/0174091 A1 | 11/2002 | Froyd et al. |
| 2002/0191619 A1 | 12/2002 | Shafer |
| 2002/0194289 A1 | 12/2002 | Engel |
| 2002/0198974 A1 | 12/2002 | Shafer |
| 2003/0016685 A1 | 1/2003 | Berggreen |
| 2003/0018702 A1 | 1/2003 | Broughton |
| 2003/0018765 A1 | 1/2003 | Muhlestein |
| 2003/0033589 A1 | 2/2003 | Reyna et al. |
| 2003/0037040 A1 | 2/2003 | Beadles et al. |
| 2003/0048287 A1 | 3/2003 | Little et al. |
| 2003/0061312 A1 | 3/2003 | Bodner |
| 2003/0065919 A1 | 4/2003 | Albert |
| 2003/0074430 A1* | 4/2003 | Gieseke et al. .............. 709/221 |
| 2003/0084009 A1 | 5/2003 | Bigus |
| 2003/0135508 A1 | 7/2003 | Chorafakis et al. |
| 2003/0135547 A1 | 7/2003 | Kent |
| 2003/0158894 A1 | 8/2003 | Ziserman |
| 2003/0187964 A1 | 10/2003 | Sage |
| 2003/0195921 A1* | 10/2003 | Becker et al. ............... 709/200 |
| 2003/0200459 A1 | 10/2003 | Seeman |
| 2004/0001493 A1 | 1/2004 | Cloonan |
| 2004/0003067 A1* | 1/2004 | Ferrin ........................ 709/223 |
| 2004/0015592 A1 | 1/2004 | Selgas |
| 2004/0024736 A1 | 2/2004 | Sakamoto |
| 2004/0078695 A1 | 4/2004 | Bowers et al. |
| 2004/0225865 A1 | 11/2004 | Cox et al. |

FOREIGN PATENT DOCUMENTS

| | | |
|---|---|---|
| EP | 745929 A1 | 12/1996 |
| EP | 0 810 755 A2 | 12/1997 |
| EP | 0 762 281 A3 | 3/1999 |
| EP | 0952521 A2 | 10/1999 |
| EP | 0 973 296 A2 | 1/2000 |
| EP | 0 993 725 A1 | 4/2000 |
| EP | 1 011 230 A2 | 6/2000 |
| EP | 1 012 726 A1 | 6/2000 |
| EP | 1 026 867 A2 | 8/2000 |
| EP | 1 047 226 A2 | 10/2000 |
| EP | 1 090 492 A1 | 4/2001 |
| EP | 1 091 526 A2 | 4/2001 |
| GB | 2 368 692 A | 5/2002 |
| JP | 8139757 A | 5/1996 |
| WO | WO 95/08794 | 3/1995 |
| WO | WO 95/24802 A | 9/1995 |
| WO | WO 97/49214 | 12/1997 |
| WO | WO 98/18235 A | 4/1998 |
| WO | WO 98/24208 | 6/1998 |
| WO | WO 99/01968 | 1/1999 |
| WO | WO 99/11003 | 3/1999 |
| WO | WO 99/67931 | 12/1999 |
| WO | WO 00/04665 | 1/2000 |
| WO | WO 00/41091 | 7/2000 |
| WO | WO 01/01293 A2 | 1/2001 |
| WO | WO 01/19031 A1 | 3/2001 |
| WO | WO 01/47185 A2 | 6/2001 |
| WO | WO 01/47186 A2 | 6/2001 |
| WO | WO 02/47332 A2 | 6/2002 |

OTHER PUBLICATIONS

HP OpenView for Windows Workgroup Node Manager User Guide, 3COM, Jan. 1997, Part No. 09-1114-000, Hewlett-Packard Co., Santa Clara, CA USA.

Administrator's Guide, Formulator 3.0, 2000-2002, GoldWire Technology Inc.

User Guide, Formulator 1.0, 2000-2001, Gold Wire Technology Inc.

Superstack II Hub TR Network Management Module Installation Guide, 3COM Jan. 1997, Hewlett-Packard Co., Santa Clara, CA USA.

Initially Configuring the ATM Switch Router, Cisco, Oct. 19, 2000, pp. 1-42.

Common Information Model—A Developer's Persepctive, IEEE, 1998, p. 1.

Liu, Stephen, Cisco IOS Command Line Interface Tutorial, 1997, Small/Medium Business Solutions, www.cisco.com/warp/cpropub/45/tutorial.htm.

Yeong et al., Lightweight Directory Access Protocol, RFC 1487, Jul. 1993.

Lonvick, C. The BSD syslog Protocol. RFC 3164 [online], Aug. 2001 [retrieved on Mar. 25, 2002]. Retrieved from the Internet ,<url: HTTP://www.ietf.org/rfc/rfc3164.txt>.

Case, J., A Simple Network Management Protocol (SNMP). RFC 1098 [online], Apr. 1989 [retrieved on Mar. 26, 2002]. Retrieved from the internet <URL: http://www.ietf.org/rfc/rfc1098.txt?number=1098>.

Postel, J.B. Simple Mail Transfer Protocol. RFC 821 [online], Aug. 1982 [retrieved on Mar. 26, 2002]. Retrieved from the Internet <URL: http:///www.ietf.org/rfc/rfc0821.txt?number=821>.

Finseth, C. An Access Control Protocol, Sometimes called TACACS. RFC 1492 [online], Jul. 1993 [retrieved on Mar. 25, 2002]. Retrieved from the Internet <URL: http://www.cis.ohio-state.edu/cgi-bin/rfc/rfc1492.html>.

Anderson, B.A. TACACS User Identification Telnet Option. RFC 927 [online], Dec. 1984 [retrieved on Mar. 25, 2002]. Retrieved from the Internet <URL: http://www.ietf.org/rfc/rfc0927.txt>.

Rigney, C., et al. Remote Authentication Dial In User Service (RADIUS). RFC 2138 [online], Apr. 1997 {retrieved on Mar. 25, 2002]. Retrieved from the Internet <URL: http://www.ietf.org/rfc/rfc2138.txt>.

Rigney, C., Radius Accounting. RFC 2139 [online], Apr. 1997 [retrieved on Mar. 25, 2002]. Retrieved from the Internet <URL: http://www.ietf.org/rfc/rfc2139.txt>.

Postel, J., and Reynolds, J. Telnet Protocol Specification. RFC 854 [online], May 1983 [retrieved on Mar. 25, 2002]. Retrieved from the Internet <URL: http://www.ietf.org/rfc/rfc0854.txt>.

Gold Wire Technology, "Tracking Changes." In *Formulator 1.0 User Guide*, pp. 211-224, Mar. 25, 2002.

Lewis, L., "*Policy-Based Configuration Management: A Perspective from a Network Management Vendor*," http://www.simple-times.org./pub/simple-times/issues/8-1.html., pp. 7-27, Mar. 1, 2001.

Waldbusser, St., et al., "Policy Based Management MIB," http://www.ietf.org/internet-drafts/draft-ietf-snmpconf-pm-05.txt, pp. 1-102, Mar. 1, 2001.

Strassner, J., *A New Paradigm for Network Management: Business Deriven Device Management*,[online], 2002, http://www.ssgrr.it/en/ssgrr2002s/papers.htm, http://www.ssgrr.it/en/ssgrr2002s/papers/162.pdf.

Deca, Rudy, Cherkaoui, Omar, and Puche, Daniel, *A Validation Solution for Network Configuration*, Jan. 2002, pp. 1-17.

"FFST/2 Generic Alert Router for LAN and SNA Transports," IBM Technical Disclosure Bulletin, IBM Corp. New York, US, vol. 34, No. 11, Apr. 1, 1992, pp. 467-468, XP000303331, ISSN: 0018-8689.

ISM Customer—Aware™ Deep Discovery™; CoManage Corporation; As of Dec. 5, 2000 (2 pages).

ISM Customer—Aware™ Fault and Performance Management; CoManage Corporation; As of Dec. 5, 2000 (2 pages).

ISM Customer—Aware™ Provisioning; CoManage Corporation; As of Dec. 5, 2000 (2 pages).

ISM Customer—Aware™ Query; CoManage Corporation; As of Dec. 5, 2000 (2 pages).

ISM Customer—Aware™ Service Profiling; CoManage Corporation; As of Dec. 5, 2000 (2 pages).

Kennedy T W: "Network Operations & Management Tool Requirements for the 90s" Proceedings of the Network Operations and Management Symposium (NOMS). Memphis, Apr. 6-9, 1992, New York, IEEE, U.S. Vo. 1, 1992, pp. 122-132.

Lee, W.C. et al: "Routing Subject to Quality of Service Constraints in Integrated Communication Networks" IEEE Network, IEEE Inc. New York, US, vol. 9, No. 4, Jul. 1, 1995, pp. 46-55, XP000526591, ISSN: 0890-8044 the whole document.

Managing Managed Network Services: The Service Provider Blind Spot; Infonetics Research, The Networking Information Source; Jun. 2000 (18 pages).

PCT/US 01/45668—International Search Report dated Oct. 16, 2002.

PCT/US 01/45669—International Search Report dated Oct. 16, 2002.

PCT/US 01/45670—International Search Report dated Dec. 20, 2002.

PCT/US 01/45671—International Search Report dated Oct. 16, 2002.

PCT/US 01/45671—Written Opinion dated Dec. 13, 2002.

PCT/US 01/45672—International Search Report dated Apr. 14, 2003.

Torrente, S. et al: "Implementation of the ANSI T1M1.5 GBM-T1.214 within an ODBMS framework" Networking: Foundation for the Future, San Francisco, Mar. 28-Apr. 1, 1993, Proceedings of the Annual Joint Conference of the Computer and Communications Societies (INFOCOM), Los Alamitos, IEE Comp. Soc. Press, US, vol. 2 CONF. 12, Mar. 28, 1993, pp. 875-884, XP010032227, ISBN: 0-8186-3580-0.

Williams, R. "Web Based Enterprise Management W101" DMTF 1999 Annual Conference, 'Online! Jun. 15-16, 1999, pp. 1-21.

Wolfson, Ouri et al.: "Managing Communication Networks by Monitoring Databases", IEEE Transactions on Software Engineering, IEEE Inc. New York, US, vol. 17, No. 9 Sep. 1, 1991, pp. 944-953.

Strassner, John: Technology Series—*Directory Enabled Networks*, 1999; MacMillan Technical Publishing USA.

\* cited by examiner

REPOSITORY-INDEPENDENT SYSTEM AND METHOD FOR ASSET MANAGEMENT AND RECONCILIATION

PRIORITY

This application claims priority to U.S. provisional patent application No. 60/395,698, filed Jul. 11, 2002 entitled Repository-Independent System and Method for Asset Management and Reconciliation, which is incorporated herein by reference.

FIELD OF THE INVENTION

The present invention relates to network device management. In particular, but not by way of limitation, the present invention relates to systems and methods for maintaining network device configurations and/or generating network device configurations.

BACKGROUND OF THE INVENTION

Network devices such as routers, switches and optical devices are becoming increasingly more complicated. Typical network devices now require thousands of lines of specialized configuration instructions to operate properly. Unlike most software applications, the instructions that operate network devices can be changed on a frequent basis, and the nature of network devices often requires that each version of a device's configuration be stored. Because changes are so frequent, sizable repositories of old configurations are generated for each device. When these sizable repositories are accumulated across the thousands of network devices that frequently make up a network, cumbersome, inefficient repositories are created. In some cases, these repositories are so large that they are not useful.

Present network architecture generally requires that configuration instructions and the capabilities of a network device (referred to as "configuration knowledge") be stored together as an atomic unit. This single-data-model approach has proven difficult to maintain for sophisticated networks. When network administrators, for example, archive only the configuration data—the actual configuration instructions or some indication thereof—the configuration knowledge that was used to generate those configuration instructions is lost. When the network administrators attempt to archive both the configuration instructions and the configuration knowledge for each configuration change, the size of the archived file becomes too large because the knowledge used to generate the configuration is many times the size of the actual configuration.

For a given version of a network device, the configuration knowledge is generally invariant, e.g., the operating system and hardware for the network device do not change. Thus, repeatedly archiving the configuration knowledge is wasteful.

Network administrators have also found that the single-data-model implementation makes reverting to previous configurations difficult. When the configuration data and the configuration knowledge are bundled together as an atomic unit, network administrators have significant difficulty in reverting to a previous device configuration when both the configuration instructions and the configuration knowledge change. For example, when a network device is upgraded to run a new version of its operating system, both the configuration knowledge and the configuration data are changed. If the upgrade fails, rolling back the changes to a known state for the previous operating system.

Present network technology suffers from yet another drawback in that it lacks a common information model that can be used to derive each of the application-specific configurations. This lack results in network applications having difficulty in retrieving and sharing network information from different network devices. Even more problematic is the fact that the lack of the common information model results in network applications sharing network data infrequently. For example, each application might implement its own procedure for discovery of network devices because it cannot understand information generated by another network application.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In one embodiment of the present invention, the configuration of a network device—also referred to as network resources—is separated into two portions: configuration knowledge and configuration data. Configuration knowledge for a particular network device is referred to as a configuration knowledge instance. Similarly, configuration data for a particular network device is referred to as a configuration data instance.

Configuration knowledge abstractly represents the capabilities of a network device, but not necessarily the actual configuration of that device. For example, the configuration knowledge for a router might indicate the types of traffic conditioning, chip organization, and routing protocols that are available to that router. Configuration knowledge can be comprised of individual configuration schemata, which define the individual portions that make up the complete configuration knowledge.

Because configuration knowledge for a device can be constructed from a set of individual schemata, when the capabilities of that network device are changed, the relevant portion of the configuration knowledge instance can be changed without otherwise rebuilding the entire configuration knowledge instance. For example, if a new card is added to a router, then the schemata for that new card is added to the configuration knowledge instance. The remaining portion of the configuration knowledge instance, however, may remain unchanged.

The configuration data for a particular network device can be derived from the configuration knowledge instance for that device. Moreover, each configuration data instance can be associated with a particular version of the configuration knowledge instance. For example, if a router is updated with a new operating system (OS), a new version of the configuration knowledge instance that reflects the new OS is created. Subsequent sets of configuration data can be associated with the new version of the configuration knowledge instance.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Individual network devices are typically associated with a device configuration that controls the operation of that network device. In one embodiment of the present invention, the device configuration for network device is separated into two portions: configuration knowledge and configuration data. Configuration knowledge abstractly represents the capabilities—both logical and physical—of a network device, and the configuration data includes information about the actual configuration of the network device. Put simply, configuration knowledge describes the features of a network device, and the configuration data indicates which features are being used and how they are being used.

Typical configuration knowledge can include separate abstractions for each feature of the network device. For example, the configuration knowledge for a particular router could list the physical properties of the router such as processor type and available cards. Similarly, the configuration knowledge could list the logical capabilities of the router such as available protocols, security features and services. The actual configuration information for these physical and logical properties would be stored with the configuration data instance for that router. Note that the configuration of most network resources, including routers, router components, switches, switch components, fabrics, optical devices, and optical components can be divided into configuration knowledge and configuration data.

Figure 1:
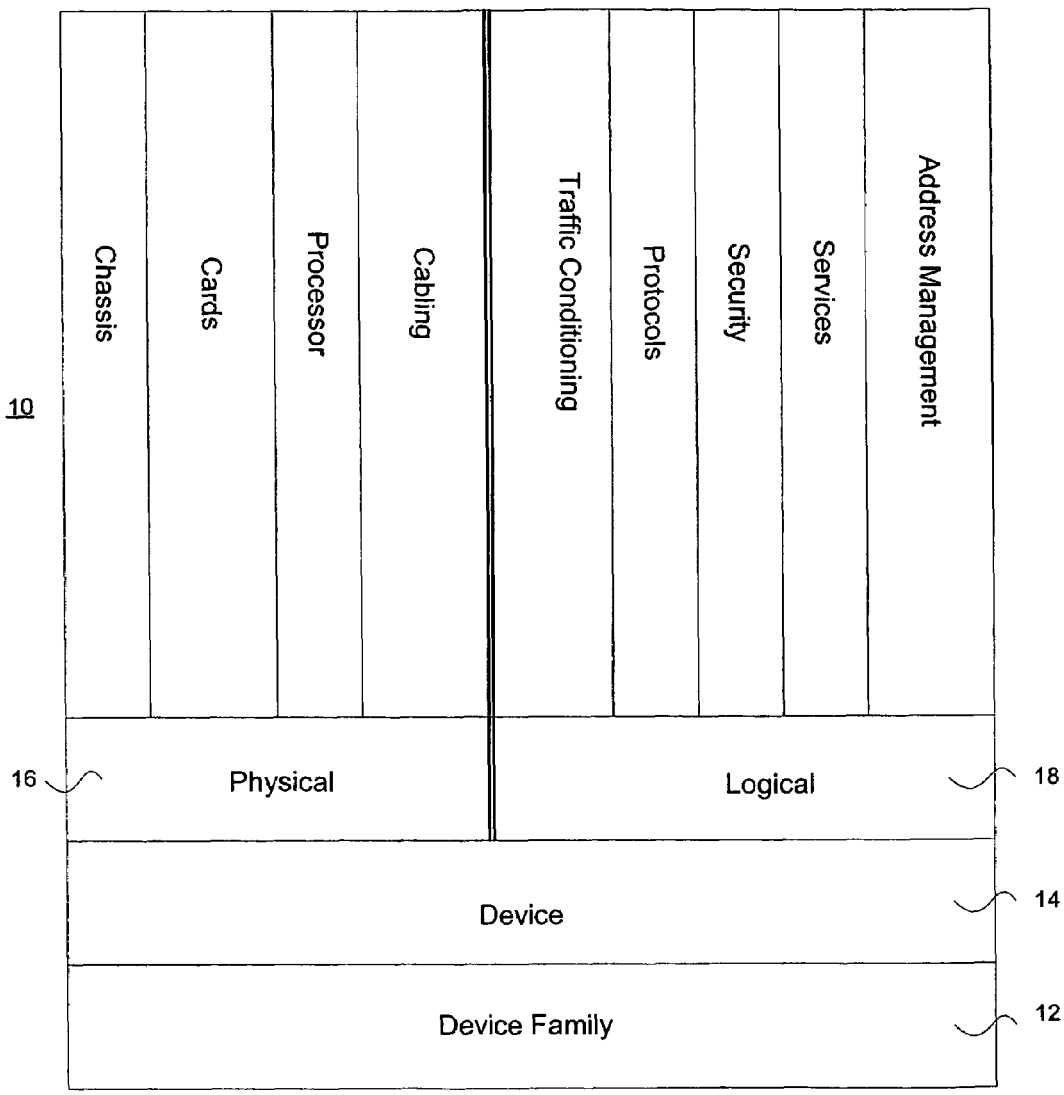
FIG. 1 illustrates one organization of a configuration knowledge instance for a network device.

Referring now to FIG. 1, it illustrates one possible organization 10 of configuration knowledge. This abstraction includes a device family layer 12 for devices that all share common features and/or other characteristics. A typical device family could be "router" or "CISCO router." The device family layer 12 is refined by the device layer 14, which represents a software abstraction of a specific device. A typical device for the "router" family could be "CISCO," and a device for the "CISCO router" family could be a particular model of CISCO router. The device family layer 12 can then further refined into its physical and logical aspects, which are represented by the physical and logical abstraction layers 16 and 18.

The physical and logical layers 16 and 18 can be refined according to the features of the family of devices being represented. For example, the logical abstraction for a router can include: address management, services, security, protocols, and traffic conditioning. Similarly, the physical abstraction can include: cabling, processors, cards, and chassis. These refinements are not inclusive, but rather exemplary for one type of device. Note that the logical and physical layers represent the capabilities of the class of network devices and not the actual configuration of any particular device.

By defining the device according to its physical and logical capabilities, configuration knowledge can support applications that require access to only physical or logical information. For example, configuration knowledge can be used to support a physical inventory application that has no need of logical information. Likewise, the configuration knowledge can support a capacity planning application that has need for both physical and logical information. In either case, the application seeking information need only query the configuration knowledge and not the actual configuration as stored in the configuration data.

Configuration knowledge can be organized using object classes, directories, and inheritance properties. For example, the template for a new instance of configuration knowledge for a CISCO router could be formed by creating an instance that inherits the properties of a "CISCO router" class, which inherits the properties of the generic "router" class. The template would then be populated with the specific information, such as available cards and operating systems, pertaining to the particular CISCO router being modeled.

Once created, individual instances of configuration knowledge can be stored together in a central storage device or distributed across multiple storage devices. For example, the configuration knowledge instances for each router on a network could be stored together in a central facility. The configuration knowledge instances can be stored in a variety of formats, including XML.

Figure 2:
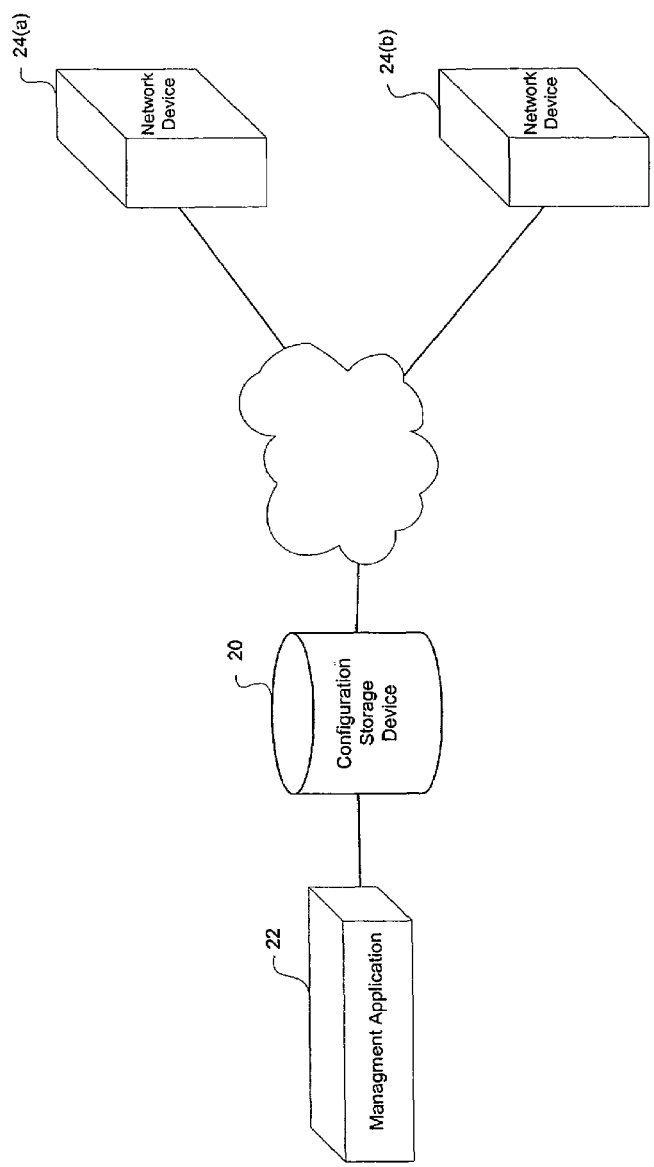
FIG. 2 is a block diagram of one embodiment of the present invention.

Referring now to FIG. 2, it is a block diagram of one embodiment of the present invention. In this embodiment, instances of configuration knowledge and configuration data are stored in a configuration storage device 20. The configuration storage device 20 is represented as a single device for simplicity only. It could be arranged in any fashion, including distributed, centralized, or some combination thereof. Additionally, a particular configuration knowledge instance and configuration data instance could also be stored at the network device 24 to which they correspond.

The configuration storage device 20 is connected to a management application 22 that can be implemented in software or hardware. Additionally, the management application 22 can consist of several individual applications, including applications distributed over a network. The management application can be responsible for several functions, including:

Facilitation of Search and Accounting of Assets

The management application 22 can search the individual configuration knowledge instances for particular capabilities. For example, the management application 22 can search for device capabilities such as hardware and software features of a network device that are no longer being used and are otherwise available. For example, consider the creation of a VPN. This requires dedicating either an interface or a sub-interface of a Physical Port of a network device to host the VPN traffic, along with dedicating logical resources that correspond to creating the instance of the VPN. This enables the network device to forward traffic on the VPN if the traffic is intended for that VPN. One example of a search is to identify components of a VPN. Similarly, if the VPN is subsequently removed, then it is important to reclaim these allocated resources. Thus, a second example of a search is to ensure that the components have been removed. A third example of a search is to ensure that adequate resources for creating the VPN exist before the commands are issued to the device. The management application 22 could also search the configuration knowledge instances for stranded services such as a virtual private network (VPN) that is no longer being used. Similarly, the management application 22 could search for software capabilities, physical ports, physical assets, and physical containers. In effect, the management application 22 can provide an accurate inventory of the capabilities of a network. Such information can be used for network management, provisioning, and identification of stranded assets.

Support for Versioning of Asset Information

The management application 22 can also support versioning of both configuration knowledge and configuration data. For example, multiple versions of configuration data could be associated with a single instance of configuration knowledge. Such versioning is particularly useful for creating different instances of configuration data that can be associated with different customer demands. Versioning is described in more detail with relation to FIG. 3.

Support for Concurrent Editing of Asset Information

The management application 22 can also enable different users to work on different parts of the configuration knowledge and configuration data simultaneously.

Support for Incremental Update to Versioned Asset Information

The management application 22 can also track which individual features of a network device are changed and how those changes impact the configuration data. For example, if an updated card was added to a particular router, then the management application could change only the portion of the configuration knowledge corresponding to the updated card. Similarly, only the portion of the configuration instructions corresponding to the changed portion of the configuration knowledge need be changed.

Figure 3:
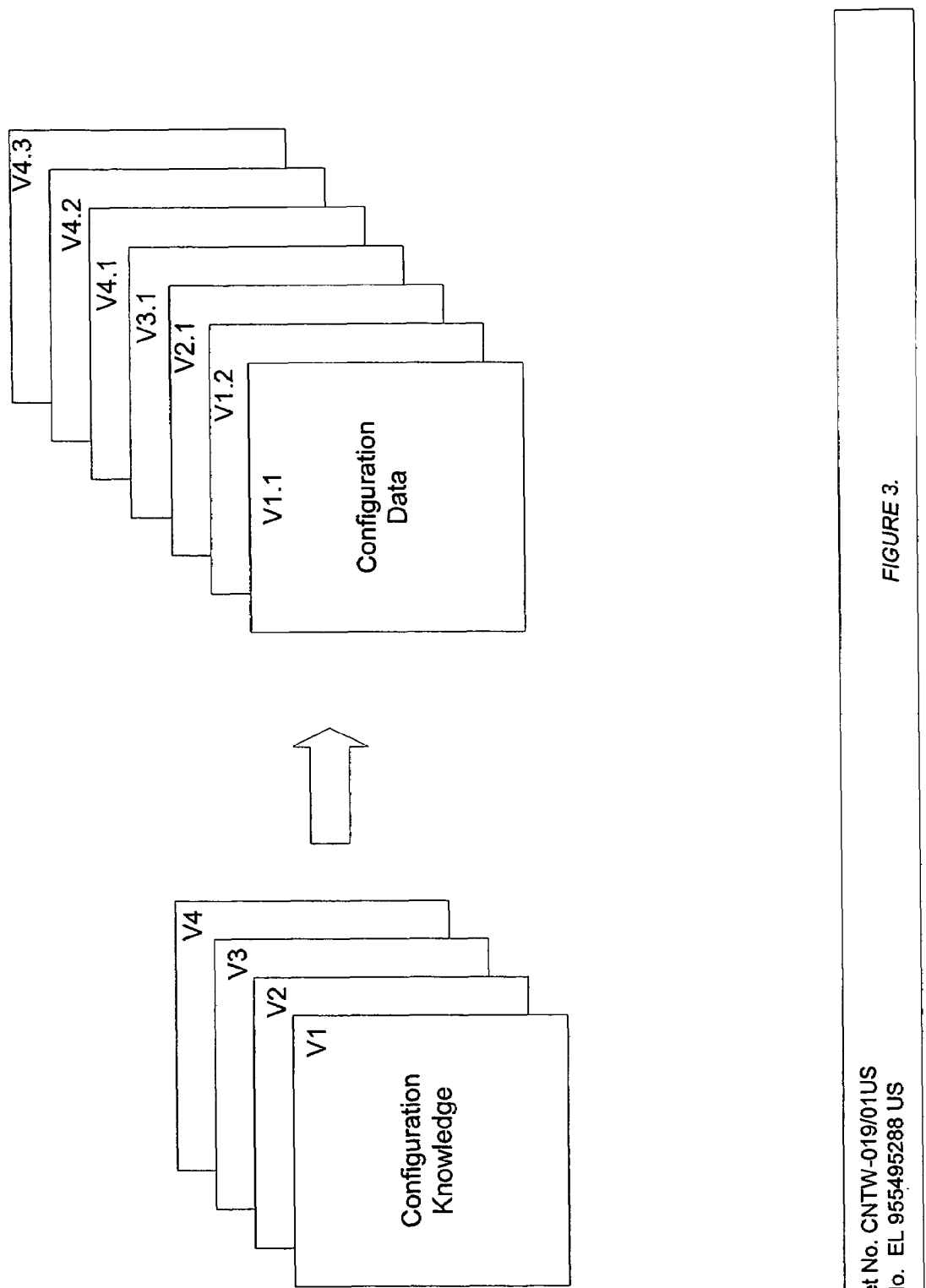
FIG. 3 illustrates versioned KDMs and configuration instructions.

Referring now to FIG. 3, it illustrates a versioned configuration knowledge instance and corresponding versions of configuration data. In this embodiment, the configuration knowledge instance is associated with a particular network device and includes versions 1 through 4. The configuration data also corresponds to the network device and includes versions 1.1 through 4.3. Each version of the configuration data instance is associated with at least one of the versions of the configuration knowledge. For example, configuration data V1.1 and V1.2 correspond to configuration knowledge instance V1. Similarly, configuration data instance V2.1 corresponds to configuration knowledge instance V2.

Figure 4:
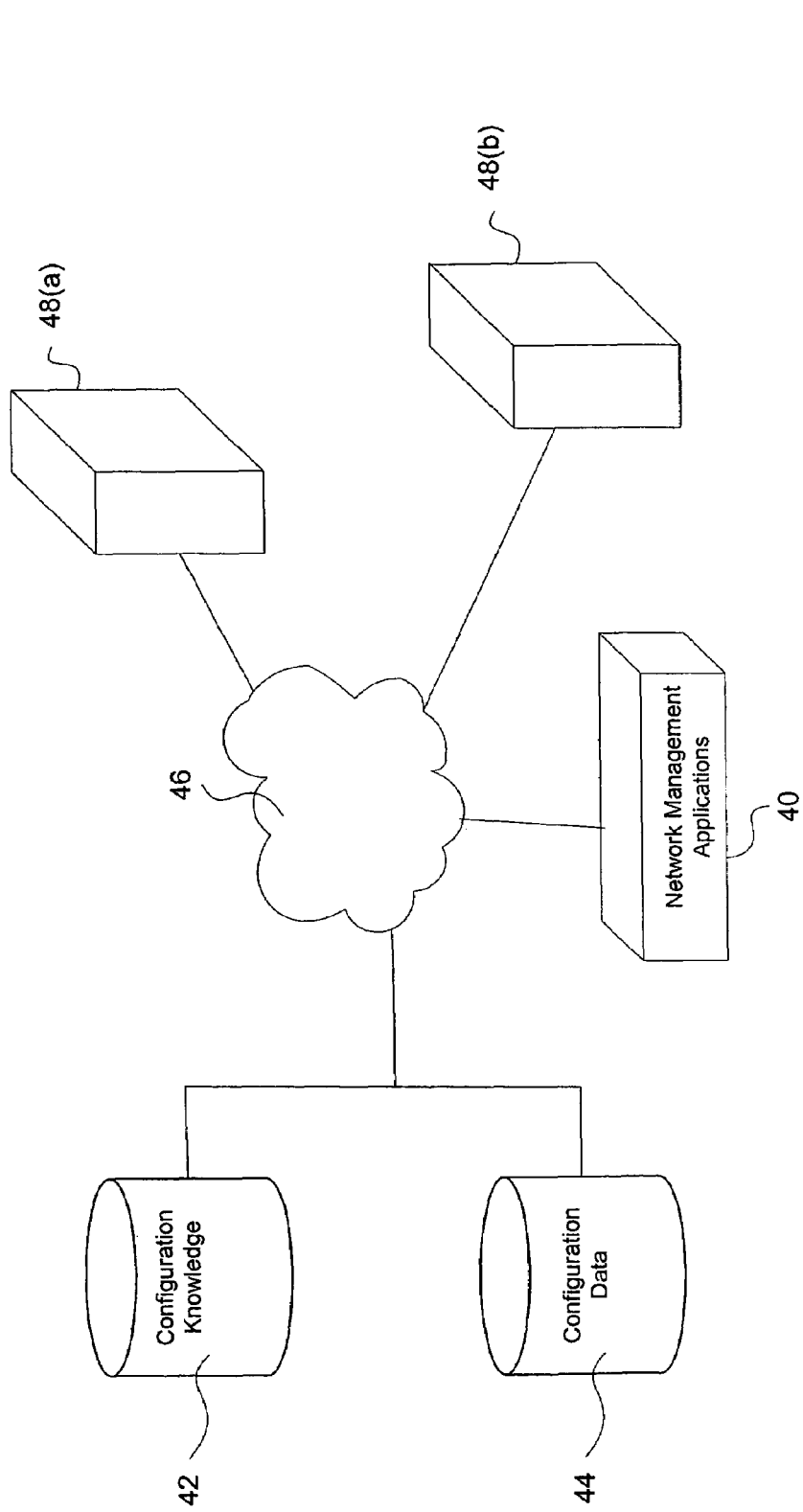
FIG. 4 is a block diagram of a network including network management applications and configuration knowledge and data storage devices.

Referring now to FIG. 4, it is a block diagram of a system that includes network management applications 40 connected to a centralized configuration knowledge storage device 42 and configuration data storage device 44. In this embodiment, a plurality of network management applications 40 are connected to the storage device through a network 46. The storage devices 42 and 44 are also connected to network devices 48(a) and (b) such as router through the network.

When a network management application 40 needs configuration data about a particular network device or group of network devices, the network management application 40 can access the network device 48 directly and read the relevant information. This process, however, generally requires the network management applications 40 to understand the particular syntax of the network device's configuration. In one embodiment of the present invention, however, the network management application 40 can access the storage device 42 or 44 and retrieve the relevant configuration knowledge instances or portions thereof.

Because the configuration knowledge instances are abstractions of the capabilities of the device, the network management applications 40 generally are not required to understand the device-specific syntax of a particular network device. For example, a physical inventory application could access the configuration knowledge instances for the relevant network devices and determine the cards that are used by each device without regard to the syntax of the actual configuration instructions.

Figure 5:
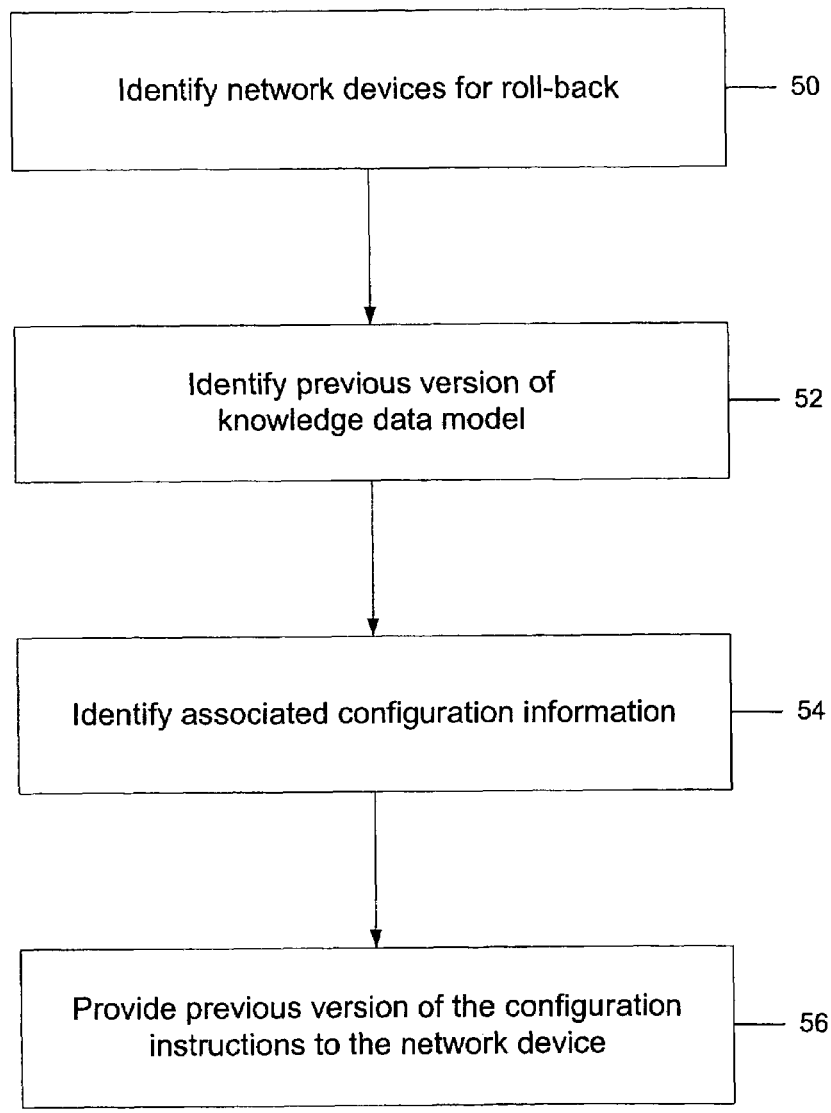
FIG. 5 is a flowchart of one method for implementing a roll-back.

Referring now to FIG. 5, it is a flowchart of one method for implementing a roll-back using configuration knowledge instances and versioned configuration data. Roll-backs are often useful for network administrators after network attacks or after unsuccessful network device updates—although they are useful in several other cases. For example, new hardware is often added to existing routers in a network. This new hardware can introduce new capabilities to the router that are reflected in a new version of the router's configuration knowledge instance. Additionally, the configuration data for the router is usually modified to engage the new hardware. Thus, in this type of system upgrade, both the configuration knowledge instance and the configuration data instance for the router are modified.

Assuming that a system upgrade is unsuccessful for some reason, network administrators often wish to roll-back the configuration to a previous, known configuration. For example, if the added card was defective, the network administrator might want to remove the defective card and roll-back the configuration to a configuration based on router that does not include the card. To roll-back the configuration, the assembler or some other device can identify the device [step 50] and a version of the configuration knowledge instance that does not reflect the card's presence [step 52]. The configuration data associated with that version of the configuration knowledge instance can then be identified [step 54] and pushed to the network device [step 56].

Figure 6:
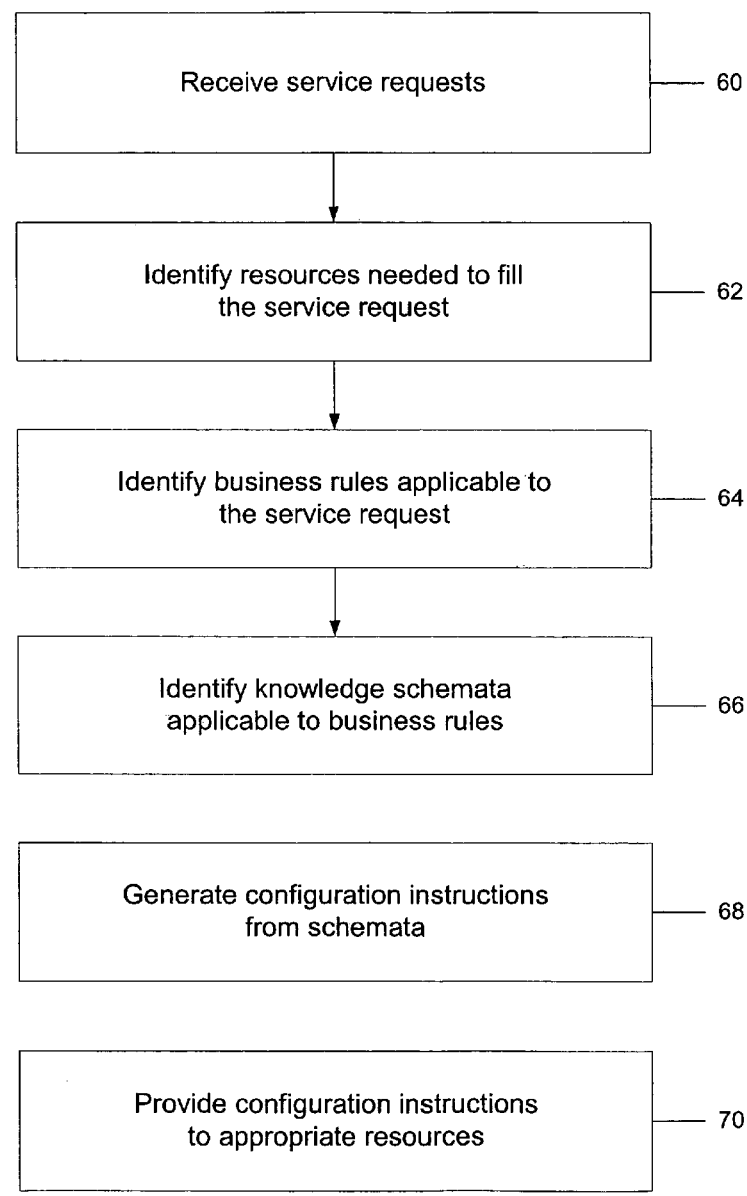
FIG. 6 is a flowchart of one method for implementing a business policy in a network.

Referring now to FIG. 6, it is a flowchart of one method for generating a business object model (BOM) for implementing a specific purpose in a network. In this embodiment, a user or application requests a device configuration to perform a certain function [step 60]. For example, assume that it is desired to create a VPN. The actual list of commands required to accomplish this task vary by vendor and also by version of the operating system that the network device is running. Therefore, in order to provide a single high-level ability to create a VPN, detailed knowledge of the differences in command syntax and semantics must be provided. In various embodiments of this invention, this is done through the use of a BOM, which correlates and assembles the individual knowledge instances. In a preferred embodiment of this invention, there will be many such BOMs, with a BOM for each type of function. Note that the function can be small or large, a command change or a VPN creation being examples of each. For the VPN creation, there will be a set of BOMs that are aggregated into a higher-level BOM. This request is handled by a BOM assembler. The BOM assembler determines which network resources are required to carry out the request [step 62]. The BOM assembler next gathers information from the configuration knowledge instances associated with the identified network resources [step 66].

Finally, the BOM derives the device configuration from the gathered configuration knowledge instances and generates the actual configuration commands [step 70]. For example, in the configuration of a VPN, the BOM assembler will select appropriate BOMs, aggregate them together, and use the aggregated BOM to derive the appropriate device configuration commands for each device. This enables the device to be programmed at a high functional level, and to have these high-level functions translated to a low-level device-specific implementation. Examples of systems for generating commands are described in commonly owned and assigned U.S. patent application Ser. Nos. 09/730,671, entitled "Dynamic Configuration of Network Devices to Enable Data Transfers,"

and 09/730,864, entitled "System and Method for Configuration, Management, and Monitoring of Network Resources," both of which are incorporated herein by reference. In one embodiment, the device configuration is derived by binding the variable information within the configuration knowledge instances to the business purpose of the customer. For example, a QoS business purpose could be bound to the various traffic conditioning settings.

In conclusion, the present invention provides, among other things, a system and method for managing and utilizing network device configurations. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A network device management system comprising:
   a storage facility to store at least one configuration knowledge instance and at least one configuration data instance for each of a plurality of network devices, wherein each of the plurality of network devices is configured to have multiple versioned instances of configuration knowledge and configuration data, each versioned instance of configuration data being created at a different point in time, wherein the instances of configuration knowledge describe physical and logical capabilities of the plurality of network devices and the instances of configuration data describe the physical and logical capabilities utilized by the plurality of network devices, wherein each versioned instance of configuration knowledge comprises at least one configuration knowledge schemata defining one or more capabilities of a network device;
   an assembler in communication with the storage facility, the assembler being capable of accessing the configuration knowledge instances and configuration data instances and assembling a device configuration from a selected one or more configuration knowledge instances and one or more configuration data instances; and
   a data entry facility for creating, modifying, and deleting said configuration knowledge instances and said configuration data instances.

2. The network device management system of claim 1, wherein the storage facility comprises a central storage device.

3. The network device management system of claim 1, wherein the storage facility comprises a distributed network of storage devices.

4. The network device management system of claim 1, wherein the assembler comprises a management application.

5. The network device management system of claim 4, wherein the management application is configured to execute one or more functionalities selected from the group consisting of searching for assets, accounting for assets, versioning of asset information, editing of asset information, and updating of asset information.

* * * * *